United States Patent
Heymes et al.

(10) Patent No.: US 7,763,128 B2
(45) Date of Patent: Jul. 27, 2010

(54) PROCESS FOR MANUFACTURING STRUCTURAL COMPONENTS BY MACHINING PLATES

(75) Inventors: Fabrice Heymes, Veyre-Monton (FR); David Godard, Montreuil-Juigne (FR); Timothy Warner, Voreppe (FR); Julien Boselli, Grenoble (FR); Raphaël Muzzolini, Kirkland, WA (US); Sjoerd Van Der Veen, Clermont-Ferrand (FR)

(73) Assignee: Alcan Rhenalu, Paris (FR)

( * ) Notice: Subject to any disclaimer, the term of this patent is extended or adjusted under 35 U.S.C. 154(b) by 424 days.

(21) Appl. No.: 11/691,326

(22) Filed: Mar. 26, 2007

(65) Prior Publication Data

US 2008/0236708 A1 Oct. 2, 2008

Related U.S. Application Data

(62) Division of application No. 10/736,979, filed on Dec. 17, 2003.

(60) Provisional application No. 60/446,993, filed on Feb. 13, 2003.

(30) Foreign Application Priority Data

Dec. 17, 2002 (FR) .................................. 02 15997

(51) Int. Cl.
*C22F 1/04* (2006.01)
(52) U.S. Cl. ...................... 148/552; 148/693; 148/694; 148/701
(58) Field of Classification Search ................. 148/552, 148/693, 694, 701
See application file for complete search history.

(56) References Cited

U.S. PATENT DOCUMENTS 5,221,377 A * 6/1993 Hunt et al. ................... 148/417
6,216,521 B1 * 4/2001 Heymes et al. ................ 72/302

(Continued)

FOREIGN PATENT DOCUMENTS

DE 955042 12/1956

(Continued)

OTHER PUBLICATIONS

"ASM Handbook: vol. 4 Heat Treating", ASM International, 1991, p. 854.*

(Continued)

*Primary Examiner*—Roy King
*Assistant Examiner*—Janelle Morillo
(74) *Attorney, Agent, or Firm*—Baker Donelson Bearman, Caldwell & Berkowitz, PC (57) ABSTRACT

The present invention includes a process for manufacturing metal sheets or plates and a machined metal part as well as machined products, structural components and their uses in various applications. Manufacture of a metal sheet or plate by a process of the present invention comprises casting of a rolling ingot, optionally followed by homogenization, one or more hot or cold rolling operations, optionally separated by one or more re-heating operations, to obtain a sheet, or plate and optionally one or more sheet or plate cutting or finishing operations. The sheet is pre-machined on one or both sides so as to obtain a pre-machined stock, and subjected to solution heat treatment, quenching treatment, and optionally, one or more of the following steps: controlled stretching, aging treatment, and/or cutting.

18 Claims, 8 Drawing Sheets

U.S. PATENT DOCUMENTS

2004/0035979 A1 * 2/2004 McCoskey et al. ...... 244/117 R

FOREIGN PATENT DOCUMENTS

| EP | 578607 | 1/1994 |
|----|--------|--------|
| EP | 1114877 | 7/2001 |
| FR | 1503835 | 12/1967 |
| FR | 2524001 | 8/1986 |
| JP | 62-263954 | 11/1987 |
| JP | 01-116054 | 5/1989 |
| JP | 03-044452 | 2/1991 |
| JP | 10-298692 | 11/1998 |
| JP | 2000-504068 | 4/2000 |
| RU | 1 039 101 A1 | 8/1995 |
| SU | 1 740 486 A1 | 6/1992 |

OTHER PUBLICATIONS

Russian Office Action No. 2005122471/02(025325) dated Nov. 28, 2007, pp. 1-5.

* cited by examiner

PROCESS FOR MANUFACTURING STRUCTURAL COMPONENTS BY MACHINING PLATES

CROSS REFERENCE TO RELATED APPLICATIONS

The present application is a divisional application of pending U.S. Ser. No. 10/736,979 filed Dec. 17, 2003 which is related to French Patent Application No. 02-15997 filed Dec. 17, 2002 and U.S. Ser. No. 60/446,993, filed Feb. 13, 2003, the contents of each are hereby incorporated by reference in their entireties.

BACKGROUND OF THE INVENTION

1. Technical Field of the Invention

The present invention relates generally to the manufacture of structural components from a heat-treatable alloy, particularly an aluminium alloy, by plate machining, as well as to structural components per se. These structural components may be used, for example, in aircraft construction.

2. Description of Related Art

To obtain aircraft structural components having superior mechanical strength as required for many such applications, at least two different approaches are currently used in the industry.

According to a first approach, rolled products typically between 10 mm and 40 mm thick (hereinafter "medium plate"), are employed which rolled products are typically in a temper corresponding to the structural component's desired end use. Such medium plates are stiffened by anchoring, for example, riveting, and/or by stiffeners constituted by extruded profiles, for example, profiles of T-shaped cross section.

According to a second approach, stiffeners are machined directly in a plate of more substantial thickness, typically between 30 mm and 200 mm or more (hereinafter "thick plate"), which is also in a temper corresponding to a structural component's desired end use. This process is what is known as "plate machining."

Making a structural component by assembling medium plates and profiles requires a very large number of riveting operations which, when carried out under the rigorous conditions of reliability required for an aircraft structural component, involve substantial cost. Making an integrated structural component by plate machining certainly uses more metal, since a sizeable fraction of the plate is reduced to machining scrap such as turnings and slivers, but in return, plate machining allows expensive riveting operations to be cut to a minimum.

The availability of high speed machining technology, of the order of 5,000 to 15,000 revolutions per minute, appreciably redefines the economics of design mode selection, since the duration of the machining operation is substantially reduced. This makes it possible to be able to machine increasingly complex shapes in economically affordable conditions. This is true both for parts of about 1 metre in size, and for parts of very large size, possibly over 20 m long and over 3 m wide.

The second approach (plate machining) suffers, however, from some drawbacks. As mentioned above, the plate is generally prepared in the temper corresponding to its end use prior to machining. This is because, according to the prior art, no thermo-mechanical treatment can be applied after machining. More particularly, this final temper has been obtained by solution heat treatment and quenching. In fact, two physical mechanisms restrict the quenching rate in a plate: (i) the thermal conductivity of the material constituting the plate, and (ii) the heat exchange between the surface of the plate and the quenching medium. The result is that the mechanical properties of the quenched plate vary according to its thickness.

For this reason, a number of mechanical characteristics become less acceptable as you move away from the surface of the plate. That is, the interior sections of the plate do not have the same mechanical properties as exterior portions, and in fact, the interior portions will generally have inferior mechanical properties as compared to sections that are closer to the exterior. Prior processes involved machining that effectively removed the areas in which the quenched plate possesses better mechanical characteristics. Further, any action on structural components made from such plates under normal operating conditions will necessarily involve areas of metal with mechanical properties which may vary considerably as a function of depth relative to the area near the original surface of the plate. The properties of structural components (or parts) made from such plates are, as a precaution, calculated on the basis of quite conservative actual performance models (i.e., based on the interior properties) of the part. This prevents one from taking advantage of the actual properties of the material when parts are sized. Another drawback of the plate machining process approach according to the prior art lies in the fact that quenched plates can, even after controlled stretching, house residual stresses that cause the parts to distort during machining.

According to a third approach, structural components are made with integrated stiffeners directly by extrusion. This approach suffers from several drawbacks, and is not often utilized. That is, in order to obtain extruded profiles of sufficiently significant width, very powerful extrusion presses must be used which have a very high operating cost. The maximum width that is attainable remains well below the width of a traditional rolled sheet or plate. Furthermore, some alloys do not lend themselves well to extrusion. And finally, the microstructure of an extruded part, and more particularly of an extruded profile, is not homogeneous, neither over the cross-section of the profile nor over the length of the profile; this, in turn, leads to disadvantages in terms of quality assurance.

Various means have also been proposed to control the distortions of the product or its mechanical properties. Several patents seek to optimise the quenching process in order to minimise the distortions of the metallurgical products when they are quenched. These processes generally seek to compensate for distortion by inhomogeneous cooling during quenching.

The German patent DE 955 042 (Friedrichshüitte Aktiengesellschaft) describes a horizontal quenching process wherein the edges of the sheet are cooled more highly than the centre and the bottom side more highly than the top side.

The patent EP 578 607 seeks to optimise the process of quenching extruded profiles by individual or grouped control of the water spray nozzles. By using a computer controlled device, it is possible in principle to adapt the positions of the nozzles to each profile, with final adjustment remaining empirical. The patent EP 695 590 develops a similar idea in respect of plate quenching.

The patent application WO 98/42885 (Aluminium Company of America) describes a combined water quenching and air quenching process for reducing the distortion of thin plates at quenching, and improving their static mechanical characteristics.

The French patent 1,503,835 (Commissariat àl'Energie Atomique/French Atomic Energy Authority) proposes increasing the quenching rate when the part is immersed in a cold liquid by applying a thin layer of low thermal conductivity that restricts the evaporation of the quenching environment.

The French patent 2 524 001 (Pechiney Rhenalu) proposes applying a coating to some surfaces of the product which conducts heat less well than the subjacent metal. By thus improving control of the cooling rate, it would be possible to avoid impairing product performance. This rather cumbersome process has a number of drawbacks. It is restricted to sheets or profiles of substantially constant thickness; in the case of aluminium alloys, this thickness should not exceed about 15 mm. The coatings proposed in this patent may well pollute the quenching liquid tank.

Other approaches seek to reduce the sensitivity of aluminium alloys to quenching.

SUMMARY OF THE INVENTION

The present invention proposes a new method of manufacture making it possible to obtain machined parts which in some embodiments offer a better compromise between the minimum values of the static mechanical characteristics (proof strength, elongation at fracture, tensile strength) and damage tolerance, compared with similarly shaped parts produced by a process in accordance with the prior art. In some embodiments of the present invention, variations in the mechanical characteristics within the part are reduced as compared to a similarly machined part produced by a process in accordance with the prior art.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

FIG. 5 shows schematically the geometry of one embodiment of a pre-machined plate and a sampling schedule of a pre-machined plate (FIG. 5a) and one embodiment of a non pre-machined plate (FIG. 5b), as explained in example 2.

FIG. 6 shows schematically the geometry of one embodiment of a pre-machined plate and a sampling schedule of pre-machined plate (FIG. 6a) and one embodiment of a non pre-machined plate (FIG. 6b), as explained in example 3.

DETAILED DESCRIPTION OF A PREFERRED EMBODIMENT

A purpose of the instant invention was to provide a new process for manufacturing machined metal parts capable of being used as structural components, or stocks for such parts, which makes it possible to improve the compromise between the static mechanical characteristics (proof strength, tensile strength, elongation at fracture) and damage tolerance (particularly fracture toughness) in the volume of the part and to minimise distortions induced during quenching, and which can be implemented at a particularly advantageous operating cost. The present invention is also directed to plates or sheets as well as products prepared therewith.

Instead of seeking to improve isolated steps in a manufacturing process, the present invention in an embodiment thereof, is directed toward a new integrated process that makes it possible to manufacture large-sized machined structural components, from plates or sheets, wherein the component have excellent dimensional tolerances, and offer improved mechanical characteristics.

One embodiment of the invention is directed to a process for manufacturing a machined metal part, comprising:

the manufacture of a rolled metal product such as a metal sheet or plate by a process comprising:
  a1) casting a rolling ingot, optionally followed by homogenisation,
  a2) conducting one or more operations of hot or cold rolling, optionally separated by at least one re-heating operation, to obtain a sheet or plate,
  a3) optionally conducting at least one cutting or finishing operation,
b) the pre-machining of the sheet or plate on one or both sides so as to obtain a pre-machined stock,
c) solution heat treatment of the pre-machined stock, and
d) conducting a quenching treatment.

This process may optionally be followed by one or more of the following steps:
  e) controlled stretching,
  f) aging treatment,
  g) cutting.

According to another embodiment there are provided metal parts and the use of metal parts, preferably those obtained by the above process as a structural component in aircraft construction.

According to yet another embodiment, there are provided structural components comprising an aluminium alloy for aircraft construction, advantageously obtained by a process according to the present invention.

Unless otherwise indicated, all the indications relating to the chemical composition of the alloys are expressed as a mass percentage by weight based on the total weight of the alloy. Alloy designation is in accordance with the regulations of The Aluminium Association. The tempers are laid down in European standard EN 515. Unless otherwise indicated, the static mechanical characteristics, in other words the ultimate tensile strength (UTS, also designated as $R_m$), the yield strength (YS, also designated as $R_{p0.2}$), and the elongation at fracture A, of the metal sheets or plates are determined by a tensile test according to standard EN 10002-1. Fracture toughness $K_{IC}$ was measured in accordance with ASTM standard E 399. The R-curve was determined according to ASTM standard 561-98. From the R-curve, the plane stress fracture toughness $K_C$, i.e. the fracture toughness $K_{app}$ that leads to instability of the crack, was calculated. Resistance to exfoliation corrosion was determined according to ASTM standard G 34-72. Unless otherwise indicated, the definitions given in the European Standard EN 12258-1 apply. By deviation from the mentioned standard, the term "sheet" herein means a rolled product not exceeding about 6 mm in thickness, "medium plate" refers to a rolled product of between about 6 mm and about 30 mm in thickness, and "thick plate" means a rolled product, typically above about 30 mm in thickness. "Plate" includes "medium plate" and "thick plate".

The term "machining" includes any process involving material removal such as turning, milling, drilling, boring, tapping, electro-discharge, straightening, polishing, and the like, including any later developed, but similar process(es).

The term "structural component" refers to a component used in mechanical construction for which the static and/or dynamic mechanical characteristics are of particular importance with respect to structure performance, and for which a structure calculation is usually being prescribed or made. Structural components are typically components the rupture of which may seriously endanger the safety of the mechanical construction itself, its users or third parties. In the case of an aircraft, structural components (also called "structural members") comprise for example, members of the fuselage (such as fuselage skin), stringers, bulkheads, circumferential frames, wing components (such as wing skin, stringers or stiffeners, ribs, spars), empennage (such as horizontal and vertical stabilisers), floor beams, seat tracks and doors to name a few.

According to the present invention, a problem is minimized or even resolved by quenching an already pre-machined stock, as opposed to quenching the plate from which the targeted metal part will subsequently be machined. By pre-machining, it is possible to produce a shape that is more or less close to the final targeted shape.

In a preferred embodiment of the present invention, pre-machined stock has a profile comprising one or more channels. These channels may be parallel to the direction of rolling, but other orientations are possible, for example a diagonal orientation. If it is planned to apply stretching after quenching, this profile is advantageously parallel to the direction of rolling and approximately consistent over its length, but other types of profiles are also possible if desired for any reason.

During quenching, the stock may be in the horizontal position, in the vertical position, or in any other desired position. Quenching may be carried out in any desired manner such as by immersion in a quenching medium, by spraying, or by any other appropriate means. The quenching medium may be any desired material, for example, water or another medium such as glycol; its temperature may preferably be selected between its solidification point and its boiling point, with the knowledge that the ambient temperature (about 20° C.) may be suitable in some cases.

A suitable process according to the invention comprises the manufacture of a metal sheet or plate by a process comprising:
 a1) casting a rolling ingot, optionally possibly followed by homogenisation,
 a2) conducting at least one hot or cold rolling operations, optionally separated by one or more re-heating operations, to obtain the sheet or plate,
 a3) optionally conducting at least one cutting or finishing operations,
 b) the pre-machining the sheet or plate on at least one side so as to obtain a pre-machined stock,
 c) conducting solution heat treatment of the pre-machined stock, and
 d) conducting a quenching treatment The stock thus obtained may optionally be subjected to one or more of the following steps:
 e) controlled stretching,
 f) aging treatment, and/or
 g) cutting.

At the end of this process represented by steps a) to d), in other words after quenching, and advantageously after the controlled stretching (if there is one) and/or after the aging treatment (if there is one), the pre-machined stock may be subjected to other machining operations so as to obtain the desired machined metal part. It should be understood that the shape of the stock should preferably be compatible with that of the targeted machined part. Furthermore, the shape of said stock channels should preferably be selected in such a way as to minimise uncontrolled distortion of the stock at quenching, and to optimise the mechanical characteristics of the final machined part. It is preferred in some embodiments that at least one side of the stock is flat. In this case, it is preferred that during horizontal quenching, the machined channels of the sheet are orientated downwards, that is, away from the quenching treatment application.

In some cases, it may be desirable or even necessary to subject the pre-machined stock to controlled stretching. To do this, it may be advantageous to provide that while pre-machining the stock, a length of between 50 mm and 1000 m, and preferentially between 50 mm and 500 mm at both ends of the sheet or plate does not comprise or include any machined channels, and these edge areas can also preferably be of approximately constant thickness (this part devoid of machined channels being called the "heel"), in order to allow the stretching clamps to get a proper grip. Any other method that permits the stretching clamps or other apparatus to work efficiently can be substituted if desired. The stretching is advantageously performed in such a way in some embodiments so as to lead to a permanent set of between 0.5% and 5%, preferably between 1% and 5%, and even more preferentially between 1.5% and 5%. A transverse support can be held, for at least part of the duration of the stretching if desired for any reason, on at least one of the sides of the pre-machined stock, for example by applying one or more rollers to each piece, the rollers optionally being able to move longitudinally over the surface of the piece. This is described, in respect of a non-machined plate, in the applicant's U.S. Pat. No. 6,216, 521, the content of which is incorporated herein by reference in its entirety.

In a preferred embodiment involving controlled stretching of the stock, the stock preferably comprises a "transition area" between the heels and the central area, the thickness of which decreases from the heel towards the central area with its machined channels. This heel and the transition area are preferably cropped after the controlled stretching, either mechanically, for example, by sawing or shearing, or by any other known means such as by laser beam or liquid jet. The heel portion can also be conserved, at least in part, in order to facilitate the assembly of the mechanical construction.

A process according to the invention can be advantageously applied to sheets and/or plates of precipitation hardening metal alloys, particularly to precipitation hardening aluminium alloys, and more particularly to alloys of the series 2xxx, 6xxx, and 7xxx, or to lithium-containing aluminium alloys of the series 8xxx. In a preferred embodiment, said sheets or plates comprise the following alloying elements (in wt-%) Zn 5.5-11, Mg 1.5-3, Cu 1.0-3. In a more preferred embodiment, the zinc content is comprised between 8 and 11%. In other embodiments, the alloy further comprises dispersoid-forming elements, that is to say, one or more elements selected from the group consisting of Zr, Sc, Hf, La, Ti, Ce, Nd, Eu, Gd, Tb, Dy, Ho, Er, Y, and Yb, the concentration of each of these elements, if selected, preferably comprising between 0.02 and 0.7%, and their total content preferably not exceeding 2%. Among the alloys of the 7xxx series, the alloys 7449, 7349, 7049, 7050, 7055, 7040, 7085 and 7150 are particularly preferred.

The sheets or plates are advantageously large-sized, i.e. more than 200 cm, and preferentially more than 500 cm long, and more than 60 cm and preferentially more than 120 cm in width. They are advantageously, prior to machining, more than 15 mm, preferentially more than 30 mm, and even more preferentially more than 50 mm in thickness.

In one advantageous embodiment, a 7449 aluminium alloy plate is used to manufacture a structural component with integrated stiffeners for the wing of a large capacity civil aircraft. The 7449 aluminium alloy plate preferably has thickness of about 100 to 110 mm, leading to a pre-machined stock, with a maximum thickness of about 90 to 100 mm.

In another advantageous embodiment, a plate is used in manufacturing a structural element for a wing skin with integrated stiffeners. The plate in this case preferably has a thickness of about 30 to 60 mm, leading to a pre-machined stock with a maximum thickness of about 25 to 55 mm.

In heat-treatable aluminium alloys, for small gauges, problems linked to gradients of mechanical properties rarely arise below a thickness of about fifteen to twenty millimetres. Advantages accruing from the present invention are therefore significant particularly with respect to thicknesses above about 30 to 40 mm, in other words, particularly for manufacturing structural components for aircraft wings as well as other applications involving similar size plates, especially thick plates.

Machining operations to shape the stock from the sheet or plate and to manufacture the finished part from the stock may be performed at high speed, in other words at a speed of at least 5,000 revolutions per minute, and preferentially above 10,000 revolutions per minute.

Some processes according to the present invention provide the possibility of recovering machining scrap such as slivers and turnings generated while machining to a large extent. To this end, the machining scrap should preferably be prevented from getting mixed up with other metal or non-metal materials, including other alloys of the same type. By way of example, in the case of aluminium alloys, it is generally not desirable for alloys of the 2xxx group to get mixed up with those of the 7xxx group (designation according to EN 573-1). Within the 7xxx group for example, it is preferable to separate alloys such as 7449 and 7010; this requires rigorous management of the machining scrap which the heavy plate manufacturer is in a better position to provide than a multi-material machine shop.

A process according to the invention, if it is to be used at a low cost, may act as an incentive for the machining to be carried out in the plate manufacturer's plant or under his industrial control. The instant process provides that machining scrap, particularly in 2xxx and 7xxx alloys, can be readily identified since it arises out of a known process. Accordingly, the instant process provides an opportunity for being able to recycle more significant fractions of machining scrap when manufacturing heavy plates made from 2xxx and 7xxx alloys for aircraft application. For some alloys and products, the applicant has thus been able to incorporate up to 40% of machining scrap in a process according to the invention, using methods of processing collected machining scrap and liquid metal which are known to one skilled in the art. Incorporating at least 5% of selectively collected machining scrap has proven possible in almost all cases, and a rate of at least 15% is preferred in some embodiments.

Metal parts obtained by a process according to the present invention can be used, for example, as structural components in aircraft construction. By way of example, the invention allows the manufacture of wing system panels, fuselage components, spars, ribs or wing spar boxes.

The process according to the invention has a number of advantages relative to known processes. In particular, it allows the manufacture of parts offering an improved compromise between damage tolerance and static mechanical characteristics. One skilled in the art is able to adapt the temper of the pre-machined stock to the targeted properties of the finished part, so as to take advantage of a gain in static mechanical characteristics or in damage tolerance, and/or to improve both types of characteristic at the same time. By way of example, the applicant has been able with the 7449 alloy to obtain finished parts offering a 20 to 25% improvement in fracture toughness $K_{IC}$, with virtually no deterioration of the static mechanical characteristics. As a further example, compared to the $K_{app(L-T)}$ measured on an unmachined thick plate at ⅛ thickness, premachined stock according to the present invention exhibits values, measured between two ribs at ⅛ thickness, that are about 20 to 25% higher. On a plate in alloy 7449, a $K_{app(L-T)}$ of 90 MPa√m or higher has been achieved, and even 95 MPa√m or higher (CT-type specimen with W=75 mm according to ASTM E561-98), while $R_{m(L)}$ as determined by a tensile test exceeded 550 MPa.

The invention will be better understood with the help of examples, which are however in no way restrictive in character. Each of the three examples uses sample references that are independent from those of the other examples, i.e. there is for example no relationship between sample A of example 1, sample A of example 2 and sample A of example 3.

Example 1

Figure 1:
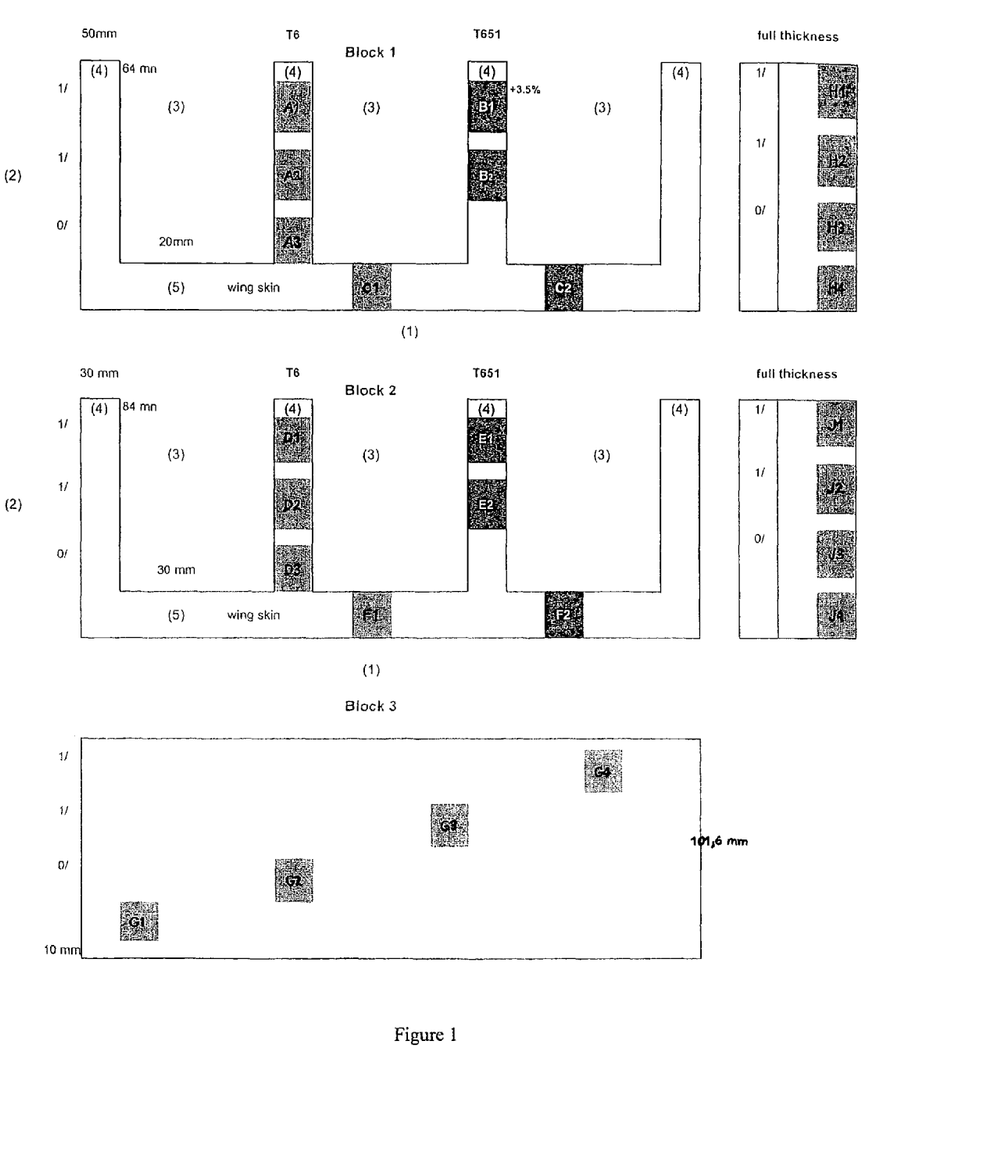
FIG. 1 shows the dimensions and the sampling plan of pre-machined plates according to an embodiment of the present invention.

From a hot-rolled plate of 7449 alloy (composition: Zn 8.52%, Cu 1.97%, Mg 2.17%, Zr 0.11%, Si 0.05%, Fe 0.09%, Mn 0.03%, Ti 0.03%) with a thickness of 101.6 mm, which had not undergone any further processing except trimming, were cut in the full thickness three blocks measuring 600 mm (direction L)×700 mm (direction LT). They were milled symmetrically of 10.5 mm to obtain blocks 80.5 mm thick. After trimming the lateral surfaces, ribs were pre-machined out of the blocks in accordance with FIG. 1, with the following dimensions (see Table 1):

TABLE 1

| Reference (see FIG. 1) | Size Block 1 [mm] | Size Block 2 [mm] |
|---|---|---|
| (1) | 692 | 672 |
| (2) | 80.5 | 80.5 |
| (3) | 164 | 184 |
| (4) | 50 | 30 |
| (5) | 20 | 30 |

Block 3 was not pre-machined.

The three blocks were solution heat treated for 4 hours to 472° C. with a 4 hour rise in temperature, and quenched by vertical immersion in agitated cold water, the ribs being orientated perpendicular to the surface of the water.

Figure 2:
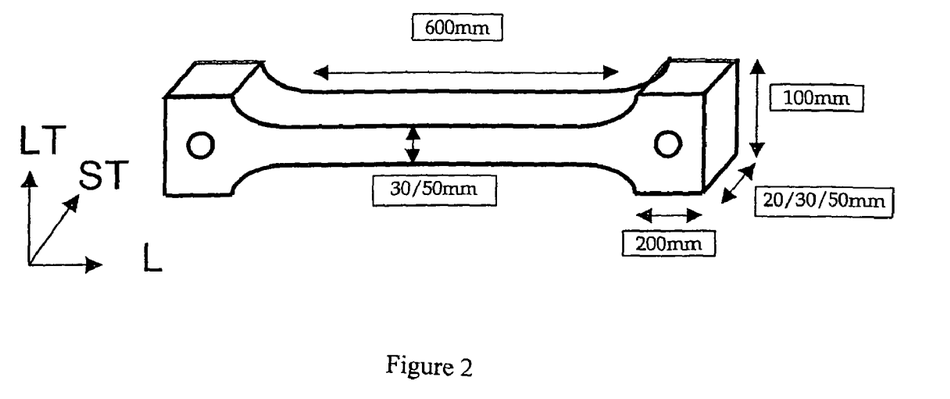
FIG. 2 shows a test piece used in characterising the mechanical properties of the product according to one embodiment of the present invention.

The blocks were then cut along the cutting scheme shown in FIG. 2. Some of the specimens thus obtained were subjected to a 48 hour ageing treatment at 120° C. to bring them to T6 temper. Other specimens were subjected to controlled stretching with a 2% permanent set, and then to the same ageing process as the other specimens, to bring them to T651 temper.

Then the mechanical characteristics were determined. The results are given in table 2.

TABLE 2

| Sample | Temper | $R_m$ [MPa] | $R_{p0.2}$ [MPa] | A [%] | $K_{IC}$(T-L) [MPa√m] | $K_{IC}$(L-T) [MPa√m] |
|---|---|---|---|---|---|---|
| A1 | T6 | 622 | 570 | 10.7 | 32.1(*) | 31.8(*) |
| A2 | T6 | 641 | 595 | 11.7 | 31.8 | 37.6(*) |
| A3 | T6 | 599 | 548 | 12.0 | | |
| B1 | T651 | 614 | 593 | 12.4 | 25.6 | 29.8 |
| B2 | T651 | 647 | 617 | 12.4 | 29.1 | 37.3 |
| C1 | T6 | 585 | 535 | 15.0 | 36.7(*) | 34.9(*) |

TABLE 2-continued

| Sample | Temper | $R_m$ [MPa] | $R_{p0.2}$ [MPa] | A [%] | $K_{IC}$(T-L) [MPa√m] | $K_{IC}$(L-T) [MPa√m] |
|---|---|---|---|---|---|---|
| C2 | T651 | 618 | 594 | 12.9 | 28.9 | 35.4(*) |
| H1 | T6 | 593 | 538 | 7.7 | | |
| H2 | T6 | 633 | 584 | 7.3 | | |
| H3 | T6 | 597 | 542 | 8.3 | | |
| H4 | T6 | 580 | 527 | 11.0 | | |
| D1 | T6 | 621 | 570 | 11.3 | 28.9(*) | 36.2(*) |
| D2 | T6 | 644 | 598 | 13.0 | 32.1(*) | 43.8(*) |
| D3 | T6 | 600 | 548 | 13.0 | 26.4 | 32.8 |
| E1 | T651 | 614 | 594 | 11.9 | 27.3 | 35.2(*) |
| E2 | T651 | 650 | 621 | 13.1 | 29.8 | 41.4(*) |
| F1 | T6 | 592 | 539 | 14.3 | 29.0(*) | 36.8(*) |
| F2 | T651 | 604 | 584 | 13.6 | 26.5 | 33.1 |
| J1 | T6 | 593 | 538 | 7.7 | | |
| J2 | T6 | 633 | 584 | 7.3 | | |
| J3 | T6 | 597 | 542 | 8.3 | | |
| J4 | T6 | 580 | 527 | 11.0 | | |
| G1 | T6 | 580 | 527 | 11.0 | 19.7(*) | 26.6(*) |
| G2 | T6 | 597 | 542 | 8.3 | 19.2(*) | 25.1(*) |
| G3 | T6 | 633 | 584 | 7.3 | 21.0 | 29.7(*) |
| G4 | T6 | 593 | 538 | 7.7 | 19.8(*) | 22.8(*) |

(*)$K_q$ values instead of $K_{IC}$

It may be noted that fracture toughness in the pre-machined stock according to the invention increases by about 10 MPa√m relative to a part according to the prior art, which equates to a gain of about 20 to 25%, with no deterioration in static mechanical characteristics.

Example 2

Figure 3:
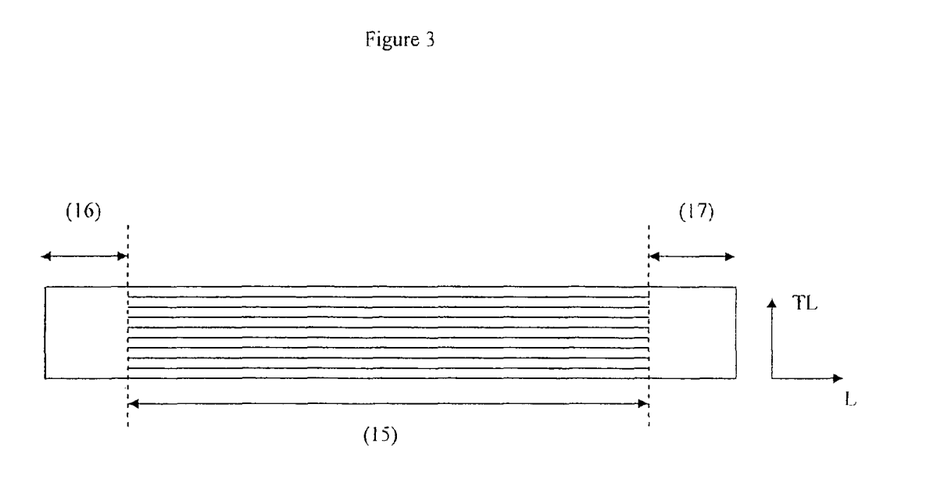
FIGS. 3 and 4 show schematically a pre-machined plate according to an embodiment of the present invention.
Figure 4:
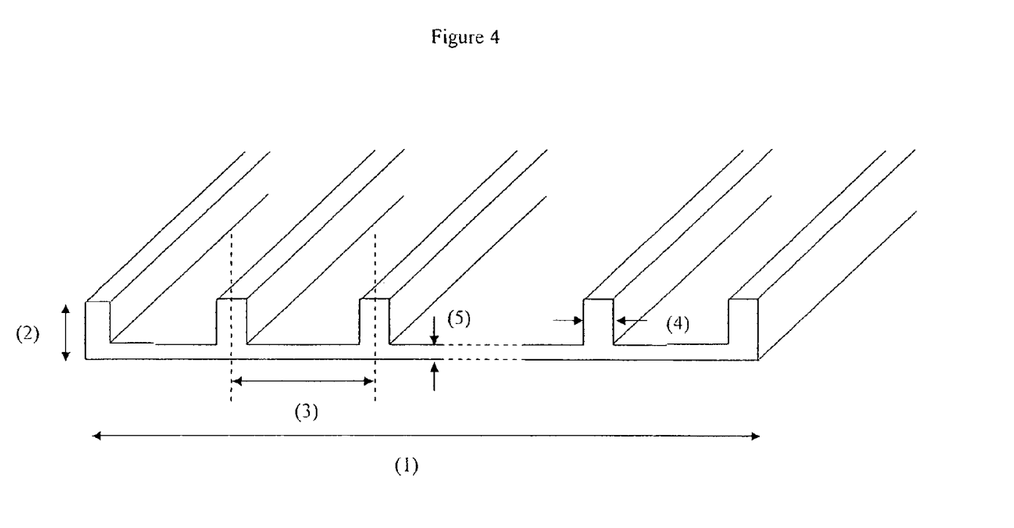

From a plate of 7050 alloy (composition: Zn 6.2%, Cu 2.1%, Mg 2.2%, Zr 0.09%, Si 0.04%, Fe 0.09%, Mn 0.01%, Ti 0.03%) with a thickness of 95 mm, in the as hot-rolled condition, which had not undergone any further processing except trimming, was cut in the full thickness a block measuring 9845 mm (direction L)×1870 mm (direction LT). After symmetrically milling of 2.5 mm, a block with a thickness of 90 mm was obtained. Ribs were symmetrically pre-machined out of the block in the L direction with a length L of 7705 mm (reference 15, FIG. 3), while leaving a zone without ribs at each extremity (see FIG. 3, references 16 and 17). The geometry of the premachined block is given, in accordance with FIG. 4, by the following dimensions (see Table 3):

TABLE 3

| Reference (see FIG. 4) | Dimension [mm] |
|---|---|
| (1) | 1870 |
| (2) | 90 |
| (3) | 140 |
| (4) | 50 |
| (5) | 25 |

Figure 5A:
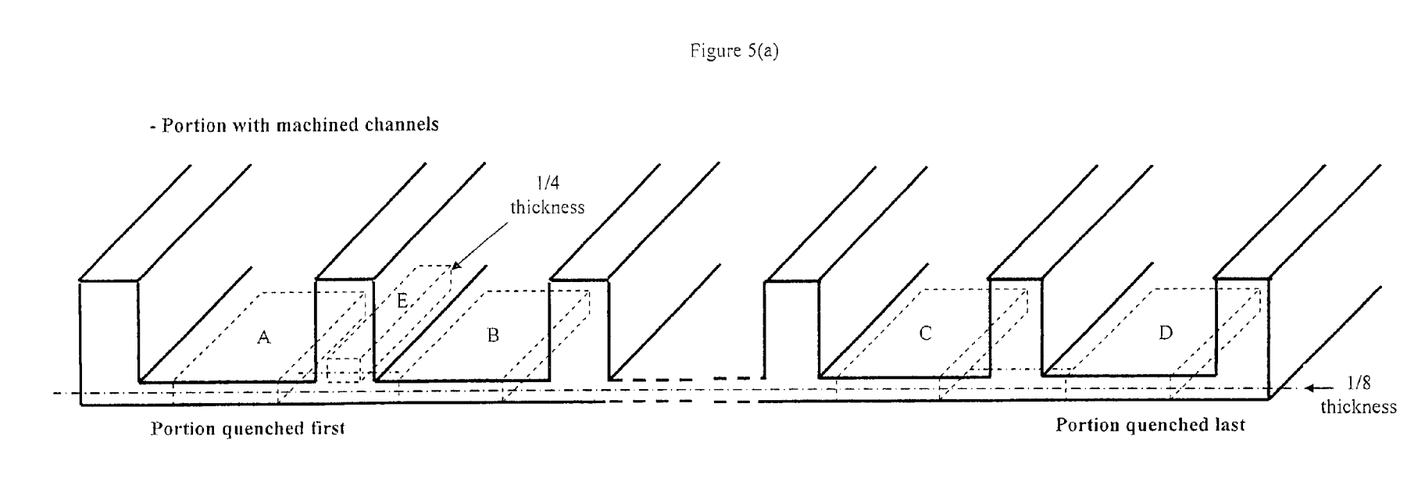
Figure 5B:
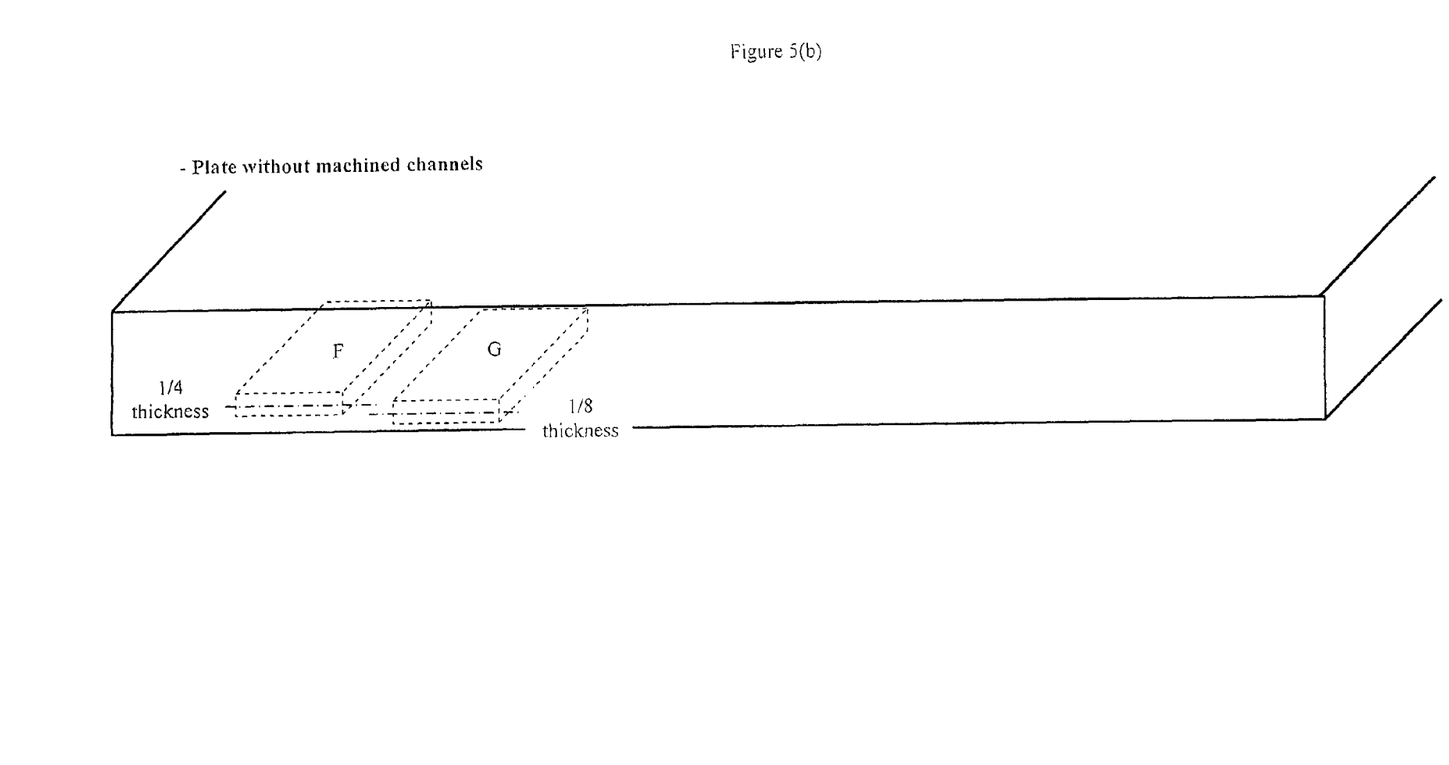

The block was solution heat treated and quenched by vertical immersion in agitated cold water, the ribs being orientated parallel to the surface of the water. The block was then subjected to controlled stretching with a permanent set of 2% in the premachined portion, and without any permanent set in the full portions at the extremities. Samples were taken from both the premachined and the full portions of the product. Samples taken from the full portions were subjected to controlled stretching with a permanent set comprised between 2 and 2.5%. Artificial peak ageing was carried out on samples taken both from machined and full portions (respectively 36 h at 130° C. and 24 h at 130° C.); these peak ageing conditions had been determined from a specific study using Vickers hardness as a criterion. Samples were taken as shown on FIG. 5. The mechanical properties obtained in the premachined and full portions are summarized in table 4. $K_{app}$ values were measured on a CT-type specimen with W=75 mm, in accordance with ASTM E561-98.

TABLE 4

| Sample | $R_{p0.2(L)}$ [MPa] (*) | $R_{p0.2(L)}$ [MPa] () | $R_{m(L)}$ [MPa] () | A [%] (L) (**) | $K_{app\,(L-T)}$ [MPa√m] | $K_{app(T-L)}$ [MPa√m] |
|---|---|---|---|---|---|---|
| A | | 514 | 551 | 17.4 | | |
| B | | | | | 82.9 | 64.2 |
| C | | | | | 82.5 | 65 |
| D | 506 | 514 | 553 | 17.6 | | |
| E | 524 | 547 | 591 | 13.8 | | |
| F | 493 | 545 | 592 | 12.5 | | |
| G | | | | | 67.9 | 58.7 |

(*) Value determined from a compression test.
(**) Value determined from a tensile test.

It can be seen that $K_{app(L-T)}$ in the premachined portion according to the invention is about 14 MPa√m higher than in a plate according to prior art. This corresponds to a gain of 20 to 25%, without degrading the static mechanical properties.

Example 3

From a plate of 7449 alloy (composition: Zn 8.8%, Cu 1.8%, Mg 1.8%, Zr 0.12%, Si 0.04%, Fe 0.06%, Mn 0.01%, Ti 0.03%) with a thickness of 90 mm, in the as hot-rolled condition, which had not undergone any further processing except trimming, was cut in the full thickness a block measuring 9950 mm (direction L)×2000 mm (direction LT). This block was cut in the long direction into two blocks, one of dimensions 9950 mm (direction L)×775 mm (direction LT) and another of dimensions 9950 mm (direction L)×1225 mm (direction LT). Ribs were symmetrically pre-machined out of the second block in the L direction with a length L of 8400 mm (reference 15, FIG. 3), while leaving a zone without ribs at each extremity (see FIG. 3, references 16 and 17). The geometry of the premachined block is given, in accordance with FIG. 4, by the following dimensions (see Table 5):

TABLE 5

| Reference (see FIG. 4) | Dimension [mm] |
|---|---|
| (1) | 1275 |
| (2) | 90 |
| (3) | 122 |
| (4) | 32 |
| (5) | 16 |

Figure 6A:
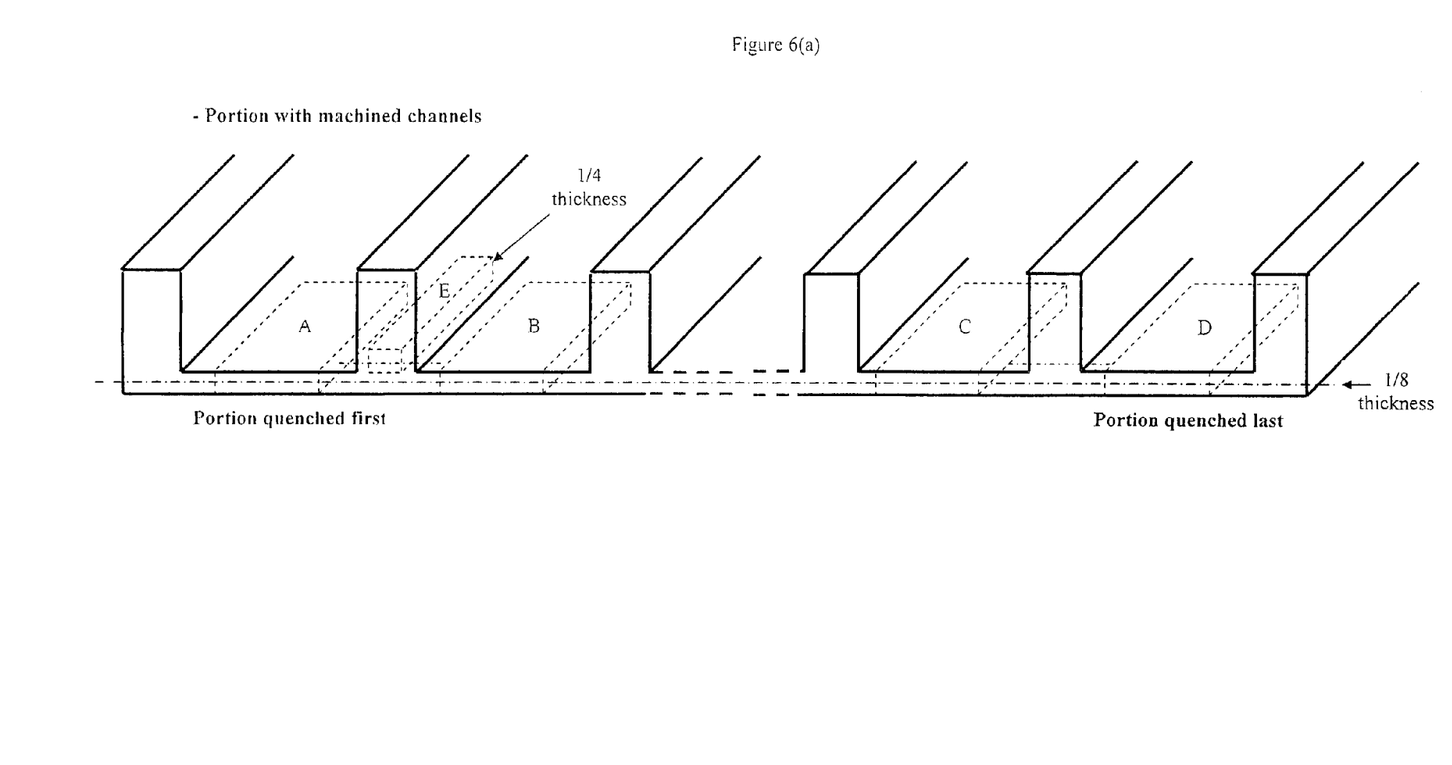
Figure 6B:
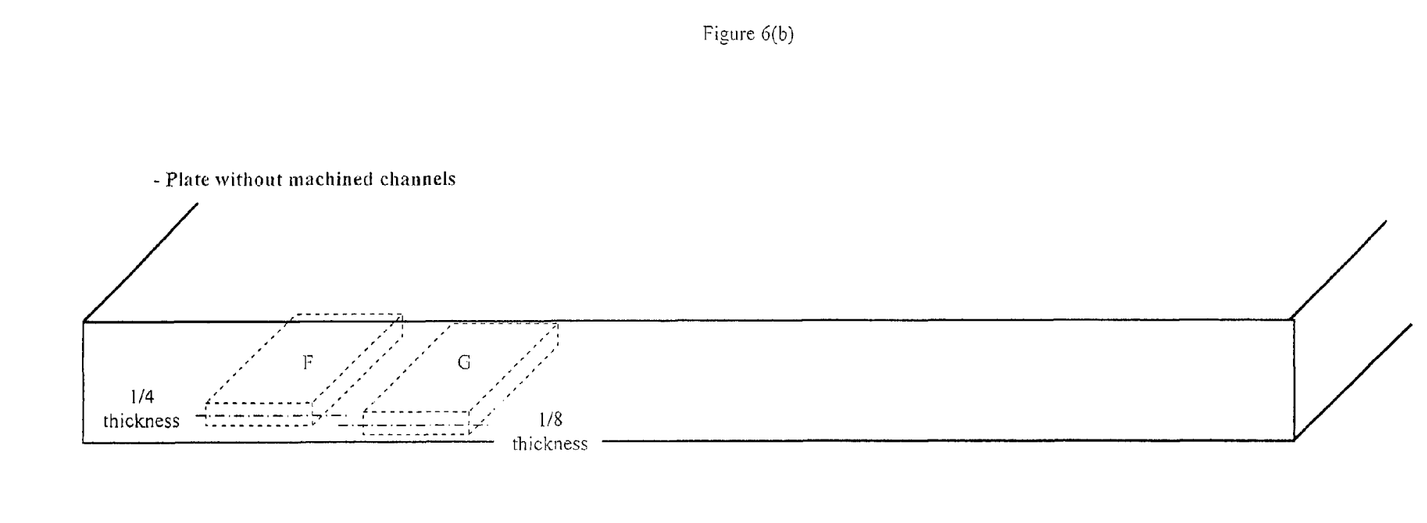

Both blocks were solution heat treated and quenched by vertical immersion in agitated cold water, the ribs being orientated parallel to the surface of the water. Both blocks were then subjected to controlled stretching with a permanent set of 2.5% (in the premachined portion for the premachined block). Samples were taken from both blocks as shown on FIG. 6. Various ageing treatment practices were tried in order to assess the advantage of the premachined bloc over prior art. The mechanical properties obtained at ⅛ thickness in the premachined and full portions are summarized in table 6. The same specimen geometry as in example 2 was used for the determination of fracture toughness.

It can be seen that $K_{app(L-T)}$ in the premachined portion according to the invention is about 8 to 18 MPa√m higher than in a plate according to prior art. This corresponds to a gain of 10 to 25%, without degrading the static mechanical properties and resistance to exfoliation corrosion.

TABLE 6

| Sample | Temper | $R_{p0.2(L)}$ [MPa] (*) | $R_{p0.2(L)}$ [MPa] () | $R_{m(L)}$ [MPa] () | A (L) [%] (**) | $K_{app\,(L-T)}$ [MPa√m] | EXCO |
|---|---|---|---|---|---|---|---|
| A1 | T651  | 551 | 564 | 598 | 18.0 | 93.7 | EA |
| A2 | T7951 | 566 | 564 | 580 | 14.8 | 91.5 | EA |
| A3 | T7651 | 528 | 534 | 558 | 16.5 | 95.0 | EA |
| B1 | T651  | 545 | 552 | 581 | 16.7 | 77.7 | EB |
| B2 | T7951 | 553 | 561 | 571 | 13.7 | 83.9 | EA |
| B3 | T7651 | 524 | 535 | 556 | 15.0 | 77.6 | EA |

(*) Value determined from a compression test.
(**) Value determined from a tensile test.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

We claim:

1. A process for manufacturing a machined metal part, comprising:
   a) preparing a metal sheet or plate comprising a heat treatable aluminum alloy by a process comprising:
      a1) casting a rolling ingot, optionally followed by homogenisation,
      a2) conducting at least one hot or cold rolling operation, optionally separated by at least one re-heating operation, to obtain said sheet or plate,
      a3) conducting at least one cutting and/or finishing operation,
   b) pre-machining said sheet or plate on one or both sides thereof to form pre-machined stock of a targeted shape consisting of one or more machined channels at least 50.5 mm deep, and wherein said shape is approximately constant over the length of the sheet or plate, wherein a length of between about 50 mm and about 1,000 mm, at both ends of said sheet or plate does not comprise any profile and is of approximately constant thickness, and wherein at least one side of said stock is flat,
   c) solution heat treating said pre-machined stock,
   d) quenching said pre-machined stock,
   e) controlled stretching of said pre-machined stock, wherein said one or more machined channels minimize uncontrolled distortion of said stock and increases fracture toughness of said metal part above the fracture toughness of what would be obtained without including said shape consisting of one or more machined channels therein, and after said controlled stretching optionally conducting one of the following: f) aging, and/or g) cutting.

2. A process according to claim 1, wherein the aluminum alloy comprises an alloy of the 2xxx, 6xxx or 7xxx series, or a lithium-containing alloy of the 8xxx series.

3. A process according to claim 1, wherein the alloy comprises (in wt-%) between about 5.5% and about 11% Zn, between about 1.5 and about 3% Mg, and/or between about 1.0 and about 3.0% Cu.

4. A process according to claim 1, wherein the shape consists of one or more channels parallel to the direction of rolling.

5. A process according to claim 1, wherein the pre-machining is carried out with a speed of at least 5,000 revolutions per minute.

6. A process according to claim 1, further comprising at least one machining and/or drilling operation after said quenching or after said controlled stretching.

7. A process according to claim 1, wherein the controlled stretching leads to a permanent set of between about 0.5% and about 5%.

8. A process according to claim 1, wherein the cutting comprises mechanically shearing or sawing, by laser beam or by liquid jet.

9. A process according to claim 1, said casting comprises using liquid metal to prepare a rolling ingot that incorporates at least 5% of machining scrap.

10. A process according to claim 1, wherein said sheet or plate comprises a transition area, said transition area being between a heel of said sheet or plate having no machined channels, and a central area thereof which has machined channels, wherein the thickness of said transition area decreases from the heel towards the central area.

11. A process according to claim 1, wherein said sheet or plate is at least about 60 cm in width.

12. A process according to claim 1, wherein the sheet or plate is at least about 200 cm in length.

13. A process according to claim 1, wherein the sheet or plate is, prior to machining, at least about 15 mm in thickness.

14. A process according to claim 11, further comprising cropping the heel and the transition area after the controlled stretching.

15. A process according to claim 1, wherein the controlled stretching is carried out between at least two clamps to obtain a controlled permanent set of at least about 0.5%, and that a transverse support is held, for at least part of the duration of the stretching, over at least one surface of the sheet or plate.

16. A process according to claim 15, wherein the permanent set is more than 1.5%.

17. A process according to claim 15, wherein support on said at least one surface of the sheet or plate is provided by at least one roller subjected to application stress on the sheet or plate.

18. A process according to claim 17, wherein said roller is capable of moving longitudinally over the surface of the sheet or plate.

* * * * *